Figure 1:
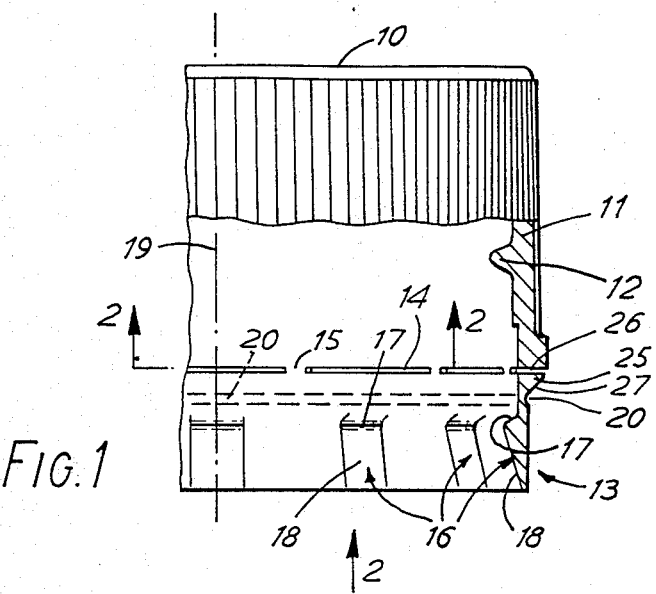

United States Patent [19]

Thompson

[11] Patent Number: 4,899,898
[45] Date of Patent: Feb. 13, 1990

[54] CLOSURES FOR CONTAINERS

[75] Inventor: Nigel Thompson, Stourbridge, England

[73] Assignee: Metal Closures Limited, West Midlands, England

[21] Appl. No.: 238,862

[22] Filed: Aug. 31, 1988

[30] Foreign Application Priority Data

Sep. 3, 1987 [GB] United Kingdom ............... 8720683

[51] Int. Cl.⁴ .............................................. B65D 41/34
[52] U.S. Cl. ................................................... 215/252
[58] Field of Search ......................................... 215/252

[56] References Cited

U.S. PATENT DOCUMENTS 4,196,818 4/1980 Brownbill ............................. 215/252
4,526,282 7/1985 Dutt et al. ............................ 215/252
4,549,667 10/1985 Dullabaun ........................... 215/252

Primary Examiner—Donald F. Norton
Attorney, Agent, or Firm—Roland T. Bryan

[57] ABSTRACT

A container closure molded from plastics material has a top, an annular skirt depending from the top and formed with a screw-threaded on its internal surface, and a tamper-evident ring connected to the bottom edge of the skirt by frangible bridges. The radially inner surface of the ring is formed with wedge-shaped inwardly projecting protrusions for engaging under a security band on the neck of a container. An annular groove is formed on the radially-outer surface of the ring at a location axially between the upper ends of the protrusions and the bridges, and serves to form a hinge in an advantageous method of molding the closure.

16 Claims, 5 Drawing Sheets

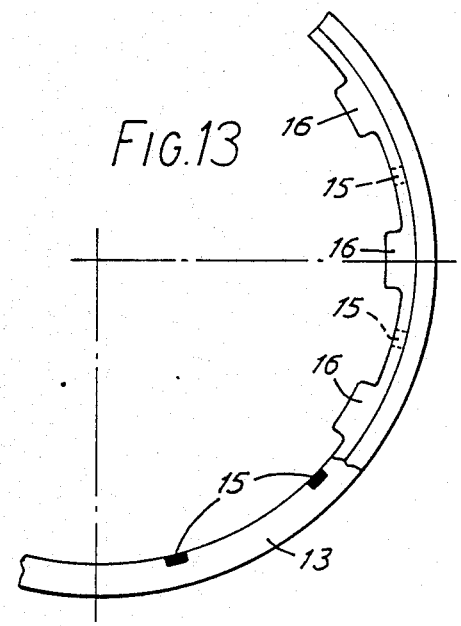
FIG.13
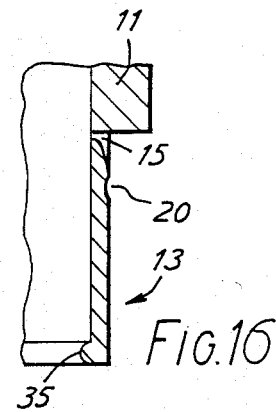
FIG.16
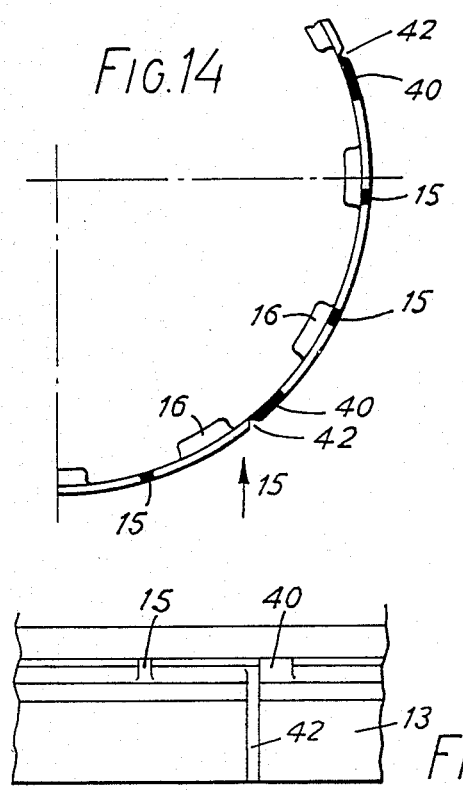
FIG.14
FIG.15
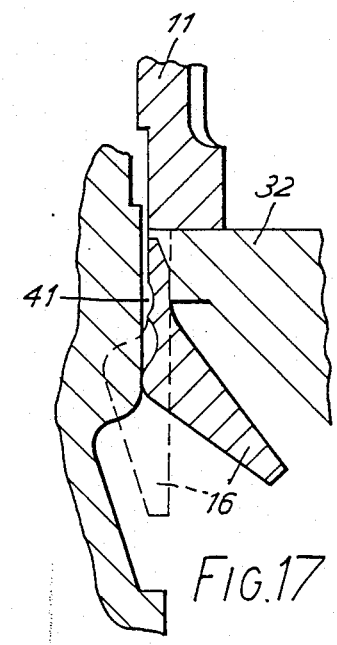
FIG.17

CLOSURES FOR CONTAINERS

This invention relates to closures for containers and the manufacture thereof.

According to this invention there is provided a container closure moulded from plastics material and comprising a top, an annular skirt depending from the top and formed with a screw-thread on its internal surface, and a tamper-evident ring connected to the end of the skirt remote from the top by a series of frangible bridges extending across an axial gap or circumferential line of weakening between the ring and the skirt, said ring having on its inner surface a series of radially inwardly projecting wedge-shaped protrusions each having a generally axially-facing end surface nearer the top and a further surface facing away from the top at an angle inclined to the central axis of the closure and the ring having an annular groove formed in one of its radially facing surfaces at a location axially between the protrusions and the bridges.

Said annular groove may be formed on the radially inner surface of the ring but it is much preferred that the groove is formed in the radially outer surface of the ring.

According to another preferred feature of the invention the general outer diameter and radial thickness of the ring are less than those of the skirt in its region adjoining said gap and the outer surface of the ring is formed with a substantially continuous outwardly projecting heel or with a plurality of circumferentially-spaced outwardly projecting heels, which may respectively be disposed at the circumferential location of the protrusions, the heel or or each heel extending from the annular groove to the axial edge of the ring nearer the top and having an axial surface facing the axial end surface of the skirt across said axial gap.

In some constructions according to the invention, the said ends of one or more of the protrusions are spaced further from the top of the closure than those of others of the protrusions.

At locations circumferentially between the protrusions the outer surface of the ring preferably reduces in diameter from a location adjacent the annular groove to the axial end of the ring adjacent the skirt.

The invention also provides a method of molding from plastics material a closure comprising a top, an annular skirt depending from the top and formed with a screw-thread on its internal surface, and a tamper-evident ring connected to the end of the skirt remote from the top by a series of frangible bridges extending across an axial gap or circumferential line of weakening between the ring and the skirt, said ring having on its inner surface a series of radially inwardly projecting protrusions each having an end surface generally facing the top, but inclined radially inwardly, and the ring having an annular groove formed in one of its radially facing surfaces at a location axially between the protrusions and the bridges, which method comprises forming the radially inner profile of the closure on a mold core member, forming the outer surfaces of the top and the skirt in a mold sleeve member for disposition about the upper portions of the mold core member, forming the bridges and the portions of the external surface of the ring from the bridges to the groove, including the groove, in a third mould part, and forming the remainder of the radially outer surface of the ring in a fourth mold part, wherein after moulding of the closure in the assembled mold, the mold sleeve and the fourth mold part are removed in axially opposite directions, then the mold core member is removed axially while the closure is held against axial movement by the engagement of the third mould part against the bottom of the skirt, the pressure of the mould core member against the said end surfaces of the protrusions causing the lower portions of the ring to hinge outward out of the path of the mold core about a hinge axis formed at the location of the annular groove, and then removing the third mould member from about the closure.

Figure 2:
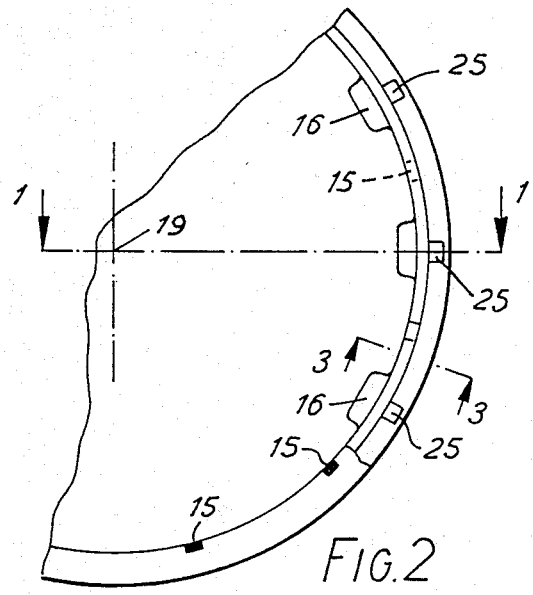
Figure 3:
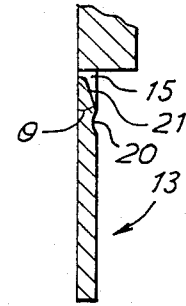
Figure 9:
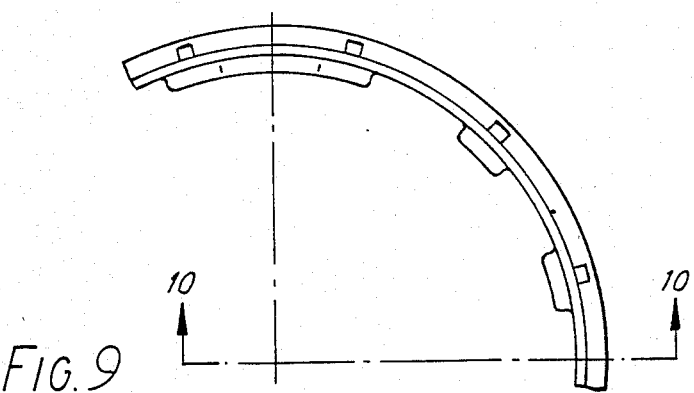
Figure 10:
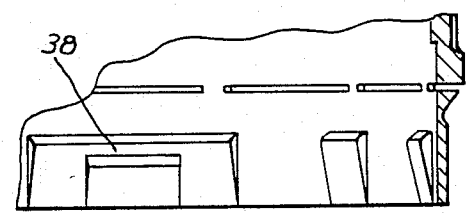
Figure 11:
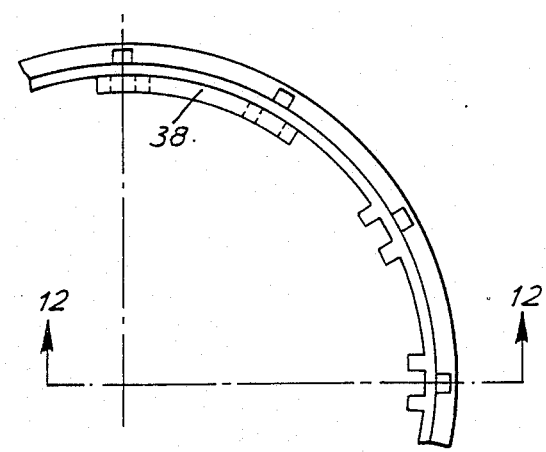
Figure 12:
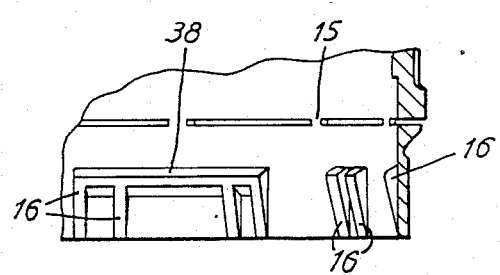

Some embodiments of the invention will now be described with reference to the accompanying diagrammatic drawings in which:

FIG. 1 is a sectional part-elevation of a closure according to the invention, on the line 1—1 of FIG. 2, FIG. 2 is an underneath plan in the direction of the arrow 2 of FIG. 1 but partly in section on the line 2—2 of FIG. 1, FIG. 3 is a fragmentary sectional elevation on the line 3—3 of FIG. 2, FIGS. 4, 5, 6, 7 and 8 illustrate the sequence of operations in stripping the closure of FIGS. 1 to 3 from the mould, FIG. 9 is a view corresponding to FIG. 2 and illustrates interconnection of the protrusions, FIG. 10 is a sectional view on the line 10—10 of FIG. 9, FIG. 11 is a view corresponding to FIG. 2 of an optional feature, FIG. 12 is a sectional view on the line 12—12 of FIG. 11, FIGS. 13 and 14 are views corresponding to FIG. 2 of two further optional arrangements, FIG. 15 is a view in the direction of the arrow 15 in FIG. 14, FIG. 16 is a view corresponding to FIG. 3 showing another optional feature, and FIG. 17 shows a further optional feature of the closure.

Referring first to FIGS. 1 to 3, the closure shown in molded from a resilient plastics material and comprises a top 10, an annular skirt 11 depending from the top and formed with a screw-thread 12 on its inner surface, and a tamper-evident ring 13 spaced from the bottom edge of the skirt by an axial gap 14 across which extend frangible bridges 15 molded integrally with the skirt 11 and ring 13.

The inner surface of the ring 13 has formed on it a series of circumferentially-spaced axially-extending wedge-shaped protrusions 16 each having its end surface 17 nearer the top inclined at a small angle of up to 15° away from the top in a radially inward direction and having a surface 18 inclined outward away from the central axis 19 of the closure. Surface 18 may be conically tapered as shown but may alternatively be partly or wholly convexly or concavely tapered, viewed in section. The protrusions are axially spaced from the gap 14 and an arcuate-section groove 20 is formed in the outer surface of the ring at a location axially between the gap 14 and the end surfaces 17 of the protrusions. The general outer diameter and radial thickness of the skirt 11 where it adjoins the gap 14 are greater than those of the ring 13, but a heel 25 axially aligned with each protrusion is formed on the outer surface of the ring at its edge adjacent the gap. As shown in FIG. 1 the heel has an axial-facing end surface 26 and an inwardly inclined outer surface 27 which merges with the outer surface of the ring at the upper edge of the annular groove 20. The heels serve to protect the bridges 15 during general handling. Above the upper edge of the groove 20, in the regions circumferentially between the bridges 15, the outer surface of the ring is inclined inward at an angle $\theta$ as shown at 21 in FIG. 3, reducing the thickness of the ring 13 in the region adjoining the gap 14. Surfaces 21 are interrupted at the locations of heels 25.

In this particular embodiment the bridges 15 are equal in number to the protrusions 16 and are equidistantly spaced between the protrusions, but the numbers and locations of the bridges and protrusions may be quite independent of each other.

The end surfaces 17 of some of the protrusions 16 may be differently spaced from the bottom edge of the ring 13 to others of the protrusions. In one such construction, surfaces 17 of four of the protrusions angularly spaced apart by 90° are a first distance from the bottom edge of the ring and the surfaces 17 of eight intermediate protrusions are a second lesser distance from the bottom edge of the ring.

When the closure is applied to a screw-threaded container having an annular security band formed with a shoulder at its lower end in the well-known manner, the inclined surfaces 18 of the protrusions come into engagement with the security band and are splayed outward by the security band causing the ring 13 to expand locally and hinge outward, assisted by the weakening effect of the annular groove 20 on the wall of the ring, until the closure is fully engaged and the protrusions pass beyond the shoulder permitting the ring to contract resiliently.

When the closure is unscrewed the end surfaces 17 of the protrusions 16 come into abutment with the shoulder on the container resisting further upward movement of the ring 13 and causing the bridges to be fractured. The removal of the closure can then be completed. Thus, fracture of the bridges is evidence that the closure has been removed. Where the end faces 17 of the protrusions are at different distances from the bottom edge of the ring 13 as described above, the frangible bridges are subjected to breaking stresses at different times which are related to the times at which the protrusions adjacent a bridge come into abutment with the shoulder on the container during unscrewing of the closure from the container.

Figure 4:
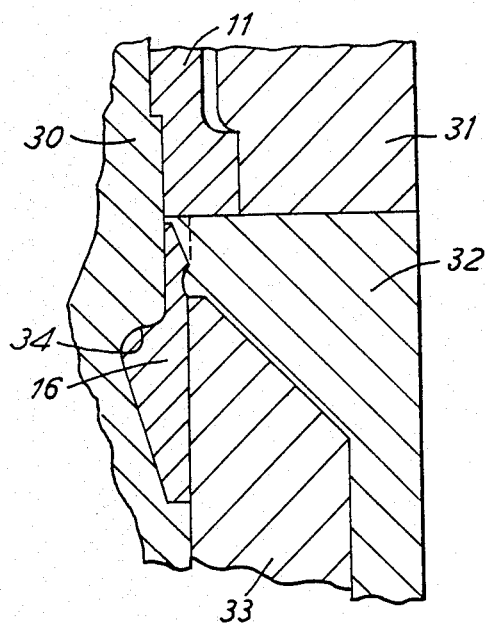
Figure 5:
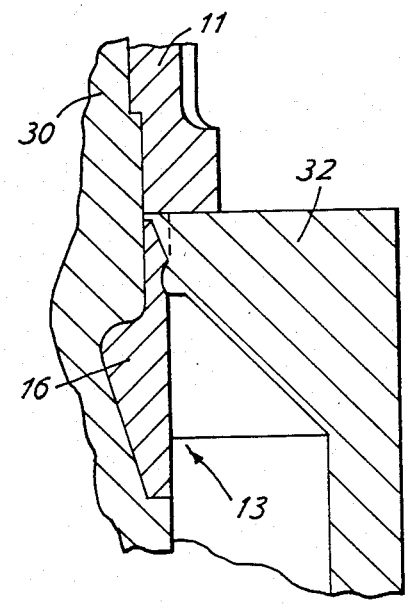
Figure 6:
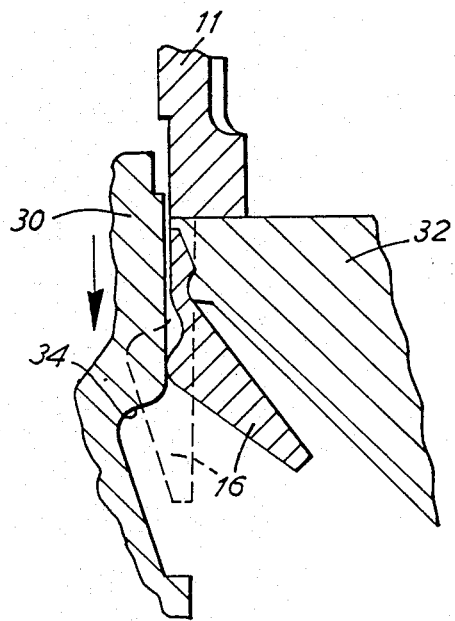
Figure 7:
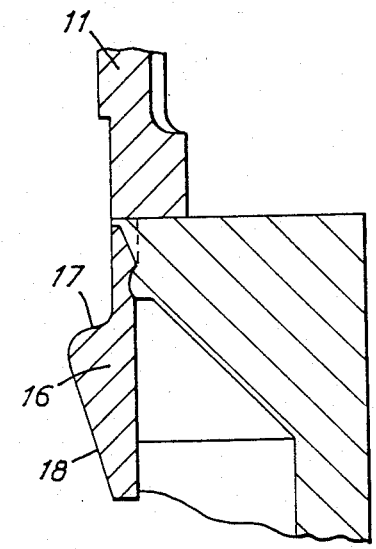
Figure 8:
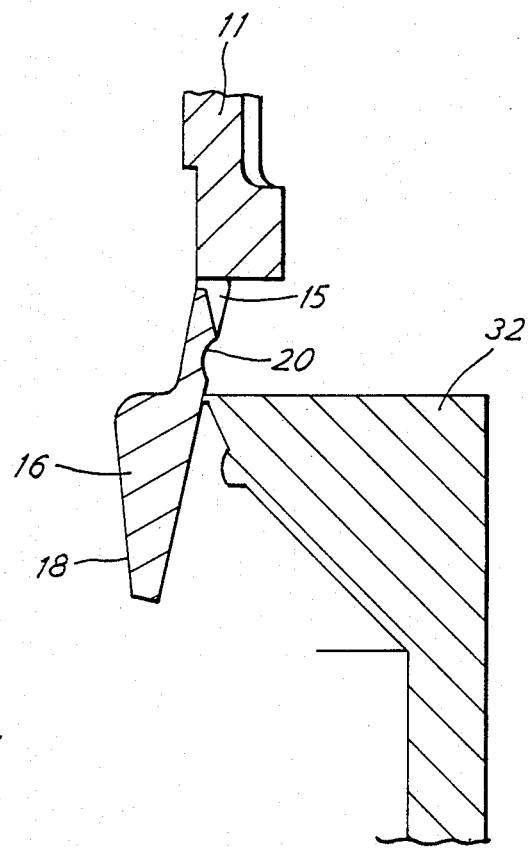

The provision of the annular groove 20 in the outer surface of the ring between the gap 14 (or a line of weakening provided for the same purpose) and the protrusions 18 are particularly advantageous in relation to stripping of the molded closure from the mold during manufacture, the sequence of operations in which is illustrated in FIGS. 4 to 8. Referring to FIG. 4, the manufacturing process is shown at the stage when the molded closure is ready for extraction from the mould. The mould comprises core member 30 which shapes the whole of the radially inner surface of the closure and the bottom edge of the ring 13, a mold sleeve 31 which shapes the outer surfaces of the top and skirt down to the top edge of the axial gap 14, a third mold part 32 which shapes the gap 14, bridges 15, heels 25, and the whole of the groove 20, and a fourth mold part 33 which shapes the radially outer surface of ring 13 below the groove 20. In the first operations to extract the molded closure mould sleeve 31 and mould part 33 are moved respectively upward and downward leaving the closure on core member 30 and encircled by mould part 32 as shown in FIG. 5. The core member 30 is now moved downward, and the force of the surfaces 34 thereof which shape the inclined end faces 17 against the faces 17 operates in a cam-like manner to push the protrusions radially outward from the position shown in broken lines so that the parts of the ring 13 below groove 20 are expanded radially, pivoting outward about the thinned wall section of ring 13 resulting from the presence of groove 20, and backed by the presence of the lower end portion of the mould part 32 in the groove 20, into the space vacated by mould part 33, as shown in FIG. 6. Downward movement of the closure during this operation is prevented by the engagement of the top edge of the mould part 32 under the bottom edge of the skirt 11. The core member 30 can now be drawn downward clear of the closure. In the final operation illustrated in FIG. 8, the closure is pushed upward through the mould part 32 if the latter is in the form of a sleeve; in this operation the sleeve assists in causing the lower portions of the ring to return to their moulded shape. Alternatively if mold part 32 is a split member, notably in cases where heel 25 is continuous, the two halves thereof are separated to release the moulded closure. The angle of inclination $\theta$ of the surface 21 between the bridges, except where the surface is interrupted by the heels 25, is selected to cause the ring to be flexed inwardly by the complementary surfaces of the mold part 32 as the mold part is removed. Significant stressing of the bridges during this operation is avoided. The preferred range of values of $\theta$ for this purpose is 17° to 28°. The ring recovers elastically to its moulded shape, but the bottom edge of the ring may if desired by strengthened, to assist recovery, by forming a bead or rim 35 on the radially inner surface of the bottom part of ring 13 as shown in FIG. 16.

Referring now to FIGS. 9 and 10, two or more neighbouring protrusions may if desired be interconnected by circumferentially extending ribs 38 formed on the radially inner surface of the ring 13 for reinforcing purposes. Ribs 38 may for example be formed at two diametrically opposite sides of ring 13.

FIGS. 11 and 12 illustrate an alternative arrangement in which the protrusions 16 are arranged in circumferentially spaced pairs. As in the arrangement of FIGS. 9 and 10, protrusions at locations along the ring may be interconnected by reinforcing ribs 38.

FIG. 13 illustrates an arrangement in which the heels 25 are omitted and in which the bridges 15 are circumferentially staggered relative to the protrusions 16. However, the numbers and positions of the bridges and of the protrusions may be varied as desired.

FIGS. 14 and 15 illustrate a modified arrangement in which some of the frangible bridges 15 are replaced by wider, stronger bridges 40, and in this case vertical or axial lines of weakening 42 are scored on the radially outer surface of the ring 13 adjacent the bridges 40. This arrangement permits the tamper-evident ring to be removed from the container with the upper parts of the closure.

The groove 20 on the radially-outwardly facing surface of the ring may be replaced by a groove 41 on the radially-inwardly facing surface of the ring, as illustrated in FIG. 17. Groove 41 is disposed axially between the gap 14 or equivalent line of weakening and the protrusions 16 for assisting the hinging of the ring 13 outward during extraction of the core member 30.

The axial gap 14 in the illustrated constructions may be replaced by a circumferentially-extending line of weakening produced by scoring or otherwise, and the line may be continuous or may be interrupted to provide one or more bridges, one or more of which may be wide bridges.

In another modification, not illustrated the protrusions 16 have a lesser circumferential extent that shown in FIGS. 1 to 3 and are arranged in pairs as shown in the right hand part of FIG. 12.

I claim:

1. A container closure molded from plastics material and comprising a top, an annular skirt depending from the top and formed with a screw-thread on its internal surface, a tamper-evidence ring, a series of frangible bridges extending across an axial gap between the ring and the skirt and connecting the ring to the end of the skirt remote from the top, and a series of radially inwardly projecting protrusions on the radially inner surface of the ring each having an end surface generally facing the top but inclined radially inwardly, the ring extending continuously between each adjoining pair of protrusions, so that outward deflection of the protrusions produces a hoop stress in the ring, and the ring having an annular groove formed in one of its radially facing surfaces at a location axially between the protrusions and the bridges.

2. A closure as claimed in claim 1, wherein said annular groove is formed in the radially outer surface of the ring.

3. A closure as claimed in claim 1, wherein said annular groove is formed on the radially inner surface of the ring.

4. A closure as claimed in claim 1, wherein the said end surfaces of one or more of the protrusions are spaced further from the top of the closure than those of others of the protrusions.

5. A closure as claimed in claim 1, wherein circumferentially-extending ribs on the radially-inner surface of the ring interconnect the protrusions in groups so as to stiffen the ring at the location of said ribs.

6. A closure as claimed in claim 1, wherein the protrusions are disposed in pairs, the protrusions of each pair being closely adjacent each other.

7. A closure as claimed in claim 1, wherein the free edge portion of the ring has a circumferentially extending stiffening bead.

8. A closure as claimed in claim 1 wherein the ring is further connected to said end of the skirt by one or more further bridges which are circumferentially wider than the first said bridges, the ring having an axial line of weakening on its radially outer surface at one circumferential side of each of said wider bridges.

9. A closure as claimed in claim 1, wherein between adjacent bridges, the radially outer surface of the ring is chamfered inward in its portions axially between the groove and the upper end of the ring.

10. A closure as claimed in claim 9, wherein the angle of said chamfer is in the range 17° to 28° to the central axis of the closure.

11. A closure as claimed in claim 1, wherein the external diameter and radial thickness of the ring are less than those of the skirt in its region adjoining said gap, radially outwardly projecting heel means formed on the outer surface of the ring and extending from the annular groove to the axial edge of the ring nearer the top and having an axial surface facing the axial end surface of the skirt across said axial gap.

12. A container closure molded from plastics material and comprising a top, an annular skirt depending from the top and formed with a screw-thread on its internal surface, a tamper-evident ring, a circumferential line of weakening between the ring and the skirt and connecting the ring to the end of the skirt remote from the top, and a series of radially inwardly projection protrusions on the radially inner surface of the ring each having an end surface generally facing the top but inclined radially inwardly, the ring extending continuously between each adjoining pair of protrusions, so that outward deflection of the protrusions reduces a hoop stress in the ring; and the ring having an annular groove formed in one of its radially facing surfaces at a location axially between the protrusions and the bridges.

13. A container closure molded from plastics material and comprising a top, an annular skirt depending from the top and formed with a screw-thread on its internal surface, a tamper-evident ring, extending continuously both axially and circumferentially from the point of connection of the bridges thereto to the free edge of the ring remote from the top, a series of frangible bridges extending across an axial gap between the ring and the skirt and connecting the ring to the end of the skirt remote from the top, and a series of radially inwardly projecting protrusions on the radially inner surface of the ring each having an end surface generally facing the top but inclined radially inwardly, and the ring having an annular groove formed in one of its radially facing surfaces at a location axially between the protrusions and the bridges and spaced axially away from the bridges.

14. A container closure molded from plastics material and comprising a top, an annular skirt depending from the top and formed with a screw-thread on its internal surface, a tamper-evident ring extending continuously both axially and circumferentially from the point of connection of the bridges thereto to the free edge of the ring remote from the top, a circumferential line of weakening between the ring and the skirt and connecting the ring to the end of the skirt remote from the top, and a series of radially inwardly projecting protrusions on the radially inner surface of the ring each having an end surface generally facing the top but inclined radially inwardly, and the ring having an annular groove formed in one of its radially facing surfaces at a location axially between the protrusions and the bridges and spaced axially away from the bridges.

15. A container closure molded from plastics material and comprising a top, an annular skirt depending from the top and formed with a screw-thread on its internal surface, a tamper-evident ring extending continuously both axially and circumferentially from the point of connection of the bridges thereto to the free edge of the ring remote from the top, a series of frangible bridges extending across an axial gap between the ring and the skirt and connecting the ring to the end of the skirt remote from the top, and a series of radially inwardly projecting protrusions on the radially inner surface of the ring each having an end surface generally facing the top but inclined radially inwardly, outward deflection of the protrusions being resisted by the parts of the ring between the protrusions and adjoining said free edge, and the ring having an annular groove formed in one of its radially facing surfaces at a location axially between the protrusions and the bridges and spaced axially away from the bridges.

16. A container closure molded from plastics material and comprising a top, an annular skirt depending from the top and formed with a screw-thread on its internal surface, a tamper-evident ring extending continuously both axially and circumferentially from the point of connection of the bridges thereto to the free edge of the ring remote from the top, a circumferential line of weakening between the ring and the skirt and connecting the ring to the end of the skirt remote from the top, and a series of radially inwardly projection protrusions on the radially inner surface of the ring each having an end surface generally facing the top but inclined radially inwardly, outward deflection of the protrusions being resisted by the parts of the ring between the protrusions and adjoining said free edge, and the ring having an annular groove formed in one of its radially facing surfaces at a location axially between the protrusions and the bridges and spaced axially away from the bridges.

* * * * *